United States Patent [19]

Jones

[11] Patent Number: 4,737,794

[45] Date of Patent: Apr. 12, 1988

[54] METHOD AND APPARATUS FOR DETERMINING REMOTE OBJECT ORIENTATION AND POSITION

[75] Inventor: Herbert R. Jones, Williston, Vt.

[73] Assignee: McDonnell Douglas Corporation, St. Louis, Mo.

[21] Appl. No.: 806,668

[22] Filed: Dec. 9, 1985

[51] Int. Cl.$^4$ .............................................. G01S 5/04
[52] U.S. Cl. .................................. 342/448; 342/386; 342/422
[58] Field of Search ............... 342/386, 422, 423, 445, 342/448

[56] References Cited

U.S. PATENT DOCUMENTS

| | | | |
|---|---|---|---|
| RE 23,397 | 8/1951 | Felch, Jr. .......................... | 175/183 |
| 2,432,858 | 12/1947 | Brown ................................. | 250/11 |
| 2,623,924 | 12/1952 | Cartier ............................... | 175/182 |
| 2,927,734 | 3/1960 | Vance ................................. | 235/189 |
| 3,103,663 | 9/1963 | Parker ................................ | 343/108 |
| 3,121,228 | 2/1964 | Kalmus ............................... | 343/113 |
| 3,133,283 | 5/1964 | Ghose ................................. | 343/100 |

List continued on next page.

FOREIGN PATENT DOCUMENTS

| | | |
|---|---|---|
| 2328720 | of 0000 | Fed. Rep. of Germany . |
| 658759 | 10/1951 | United Kingdom . |
| 684229 | 12/1952 | United Kingdom . |
| 724031 | 2/1955 | United Kingdom . |
| 755886 | 8/1956 | United Kingdom . |
| 965326 | 7/1964 | United Kingdom . |
| 1111768 | 5/1968 | United Kingdom . |
| 1157899 | 7/1969 | United Kingdom . |
| 557334 | 7/1977 | U.S.S.R. . |

OTHER PUBLICATIONS

"Mathematics Its Contents, Methods & Meaning", pp. 320–330, of vol. III, 2nd Edition published by MIT Press (1969).
Article: Kalmus, H., A New Guiding & Tracking System, IRE Trans. on Aero Space, Mar. 1962, pp. 7–10.

*Primary Examiner*—Theodore M. Blum
*Assistant Examiner*—David Cain
*Attorney, Agent, or Firm*—Price, Heneveld, Cooper, DeWitt & Litton

[57] ABSTRACT

A method and apparatus is provided for determining remote object orientation and position with an electromagnetic coupling. A plurality of radiating antennas are provided for radiating electromagnetic energy. Each of the radiating antennas have independent components for defining a source reference coordinate frame. A transmitter is provided for applying electrical signals to the radiating antennas for generating a plurality of electromagnetic fields. The signals are multiplexed so that the fields are distinguishable from one another. A plurality of receiving antennas are disposed on a remote object for receiving the transmitted electromagnetic fields. The receiving antennas have a plurality of independent components for detecting the transmitted electromagnetic fields and defining a sensor reference coordinate frame. An analyzer is provided for receiving the output of the receiving antennas and converting the components of the transmitted electromagnetic fields into remote object position and orientation relative to the source reference coordinate frame. The analyzing means includes means for processing the components of the electromagnetic fields independently into remote object position in cartesian coordinates and remote object orientation using a quaternion processing strategy. The processing technique provides an uncoupled, noniterative, closed form solution for both position and orientation which is fast and continuous. Further, in the case where dipole antennas are used and the size of the antennas is significant relative to the separation distance between the radiating and receiving antennas, an aperture compensation technique is provided for compensating for distortion in the dipole fields. Still further, the processing technique provides an arrangement for smoothing or filtering the solution for position and orientation by blending previous solutions into the current solution.

20 Claims, 2 Drawing Sheets

U.S. PATENT DOCUMENTS

| | | | |
|---|---|---|---|
| 3,187,169 | 6/1965 | Trammell, Jr. | 235/189 |
| 3,354,459 | 11/1967 | Schwartz et al. | 343/100 |
| 3,430,243 | 2/1969 | Evans | 343/112 |
| 3,432,751 | 3/1969 | Godby et al. | 324/13 |
| 3,526,886 | 9/1970 | Lubich | 340/282 |
| 3,529,682 | 9/1970 | Coyne | 175/45 |
| 3,560,977 | 2/1971 | Cayzac | 343/100 |
| 3,589,454 | 6/1971 | Coyne | 175/26 |
| 3,644,825 | 2/1972 | Davis, Jr. et al. | 324/41 |
| 3,656,161 | 4/1972 | MacPherson | 343/100 |
| 3,712,391 | 1/1973 | Coyne | 175/26 |
| 3,731,752 | 5/1973 | Schad | 175/45 |
| 3,821,523 | 9/1974 | Chisholm et al. | 235/150 |
| 3,838,409 | 9/1974 | Minasy et al. | 340/258 C |
| 3,863,256 | 1/1975 | Smith | 343/112 |
| 3,868,565 | 2/1975 | Kuipers | 342/448 |
| 3,900,878 | 8/1975 | Tsao | 343/112 |
| 3,903,747 | 9/1975 | Johnston | 73/505 |
| 3,906,504 | 9/1975 | Guster et al. | 343/112 |
| 3,952,308 | 4/1976 | Lammers | 343/108 |
| 3,983,474 | 9/1976 | Kuipers | 324/43 |
| 4,017,858 | 4/1977 | Kuipers | 343/100 |
| 4,054,881 | 10/1977 | Raab | 343/112 |
| 4,072,200 | 2/1978 | Morris et al. | 175/45 |
| 4,092,716 | 5/1978 | Berg et al. | 364/434 |
| 4,134,681 | 1/1979 | Elmer | 364/434 |
| 4,163,977 | 8/1979 | Polstorff | 343/112 |
| 4,197,855 | 4/1980 | Lewin | 128/653 |
| 4,208,024 | 6/1980 | Killpatrick et al. | 244/3.15 |
| 4,212,443 | 7/1980 | Duncan et al. | 73/504 |
| 4,287,809 | 9/1981 | Egli et al. | 89/41 |
| 4,298,874 | 11/1981 | Kuipers | 342/386 |
| 4,314,251 | 2/1982 | Raab | 343/112 |
| 4,328,548 | 5/1982 | Crow et al. | 364/449 |
| 4,346,384 | 8/1982 | Raab | 343/112 |
| 4,394,831 | 7/1983 | Egli et al. | 89/41 |
| 4,396,885 | 8/1983 | Constant | 324/208 |
| 4,424,038 | 1/1984 | Tingleff et al. | 434/2 |
| 4,550,984 | 11/1985 | Reymond | 350/404 |
| 4,613,866 | 9/1923 | Blood | 343/448 |
| 4,657,210 | 4/1987 | Hubert et al. | 244/158 R |

METHOD AND APPARATUS FOR DETERMINING REMOTE OBJECT ORIENTATION AND POSITION

BACKGROUND OF THE INVENTION

The present invention relates generally to remote object position and orientation determining systems employing an electromagnetic coupling and more particularly, is directed to new processing techniques for such systems.

Remote object position and orientation determining systems employing electromagnetic couplings are known in the prior art. Such systems are used for tracking and determining the position and orientation of remote objects in a wide variety of applications. However, the processing techniques that have been used in such prior art systems suffer from a number of limitations. The earliest systems were accurate and capable of producing solutions at all attitudes but were iterative processing techniques which slowly converged upon a solution with small angle approximations. Later, noniterative processing techniques were developed which converged faster but which included discontinuities which prevented the determination of position and orientation solutions for some sensor positions.

SUMMARY OF THE INVENTION

According to the present invention, these and other problems in the prior art are solved by providing a remote object orientation and positioning determining system wherein the accuracy of the earlier iterative processing techniques is achieved in a closed form, uncoupled, noniterative solution using cartesian coordinates for position and using a quaternion processing scheme for determining orientation. A remote object position and orientation determining system is provided comprising a plurality of radiating antennas for radiating electromagnetic energy. The radiating antennas are provided with independent components for defining a source reference coordinate frame. A transmitter is provided for applying electrical signals to the radiating antennas which generate a plurality of electromagnetic fields. The electrical signals are multiplexed so that the electromagnetic fields are distinguishable from one another. A plurality of receiving antennas are provided for receiving the transmitted electromagnetic fields. The receiving antennas are provided with independent components which define a sensor reference coordinate frame. The receiving antennas are disposed on a remote object which is to be tracked. An analyzer such as a digital computer is provided for receiving the output of the receiving antennas and converting the received components of the transmitted electromagnetic fields into remote object position and orientation relative to the source reference coordinate frame. The analyzing means includes a processor for independently converting the components of the received electromagnetic fields into remote object position in cartesian coordinates and remote object orientation using a quaternion processing strategy. The solution is accurate, fast, and continuous. The accuracy and speed of the solution render the remote object orientation and position determining system applicable to many new applications. Still further, in those cases where dipole radiators and receivers are used and the size of the radiating and receiving antennas is significant relative to the separation distance of the antennas, an aperture compensation technique is provided for compensating for distortions in the dipole fields. Still further, the processing technique provides a technique for smoothing or filtering, which involves blending previous solutions for position and orientation into current solutions.

DESCRIPTION OF THE PREFERRED EMBODIMENTS APPARATUS

Figure 1:
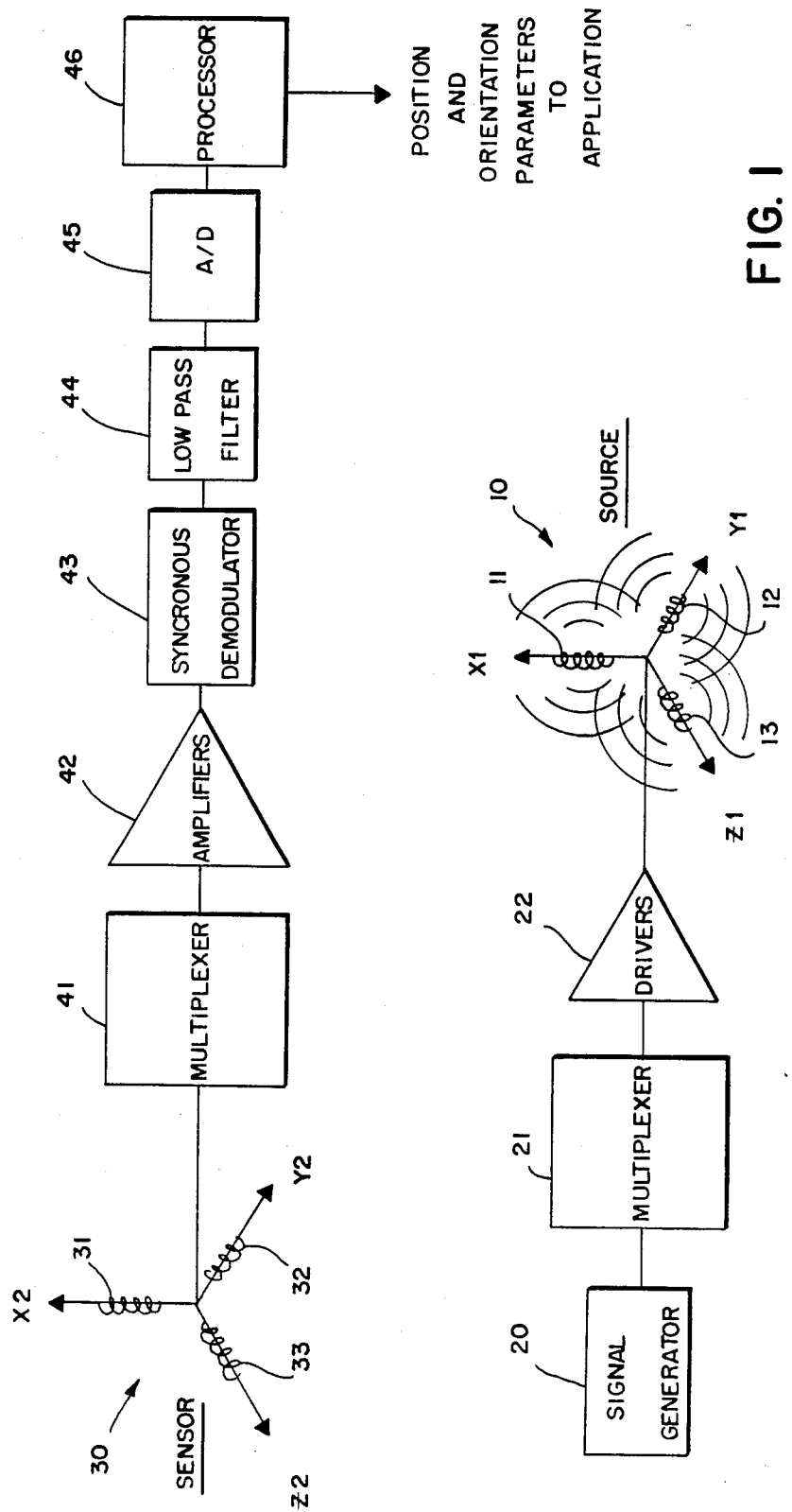
FIG. 1 is a functional diagram of the apparatus of the present invention.

With reference now to FIG. 1, a functional diagram of the apparatus for determining the position and orientation of a remote object relative to a reference coordinate frame is illustrated. A source of electromagnetic radiation is generally illustrated at 10. The source includes a plurality of radiating antennas 11, 12 and 13. Generally three orthogonal antennas are preferred. However, it is not necessary for the antennas to be orthogonal or for there to be precisely three antennas. What is necessary is that a sufficient number of radiating antennas are provided having independent components which are capable of spanning three dimensional space. In the present embodiment, the system operates in the near field. Magnetic dipole antennas are provided at 11, 12 and 13 which establish quasi-stationary magnetic fields. Quasi-stationary magnetic fields are low frequency fields that vary so slowly with time that radiation offsets are negligible. The three magnetic dipoles are orthogonal so that the antennas span three dimensional space. The three antennas, 11, 12 and 13 thus define a source reference coordinate frame identified by the axes X1, Y1, and Z1. Although the present embodiment operates in the near field with loop antennas, it should be appreciated that other embodiments may operate in the far field.

A transmitter is provided for applying electrical signals to antennas 11, 12 and 13 to generate a plurality of low frequency electromagnetic dipole fields, in this case, on the order of 10 kHz. The signals are multiplexed so that the fields emanating from each antenna are distinguishable from the other antennas. For example, functionally the transmitter includes a signal generator 20, a multiplexer 21 and driving amplifiers 22 for supplying power to each of the radiating antennas 11, 12 and 13. In most current embodiments of the invention, the signal generator comprises a sine or cosine generator and the multiplexer comprises a conventional circuit for time division multiplexing the signals applied to each of the radiating antennas. It should be understood that in this case, three driving or power amplifying circuits will be provided, each of the circuits being connected to one of the three radiating antennas 11, 12 or 13 with the multiplexer sequentially applying an excitation signal to each of the antennas through the three individual driving circuits. However, it will be appreciated by those skilled in the art that any one of a number of suitable multiplexing techniques may be employed, including frequency division multiplexing, spread spectrum multiplexing or phase multiplexing and a suitable transmitter for implementing such a multiplexing technique will be provided.

A sensor is provided, generally illustrated by the numeral 30, which comprises a plurality of receiving antennas 31, 32 and 33 for receiving the electromagnetic fields transmitted by the source 10. Since the source 10 employs loop antennas which define magnetic dipole fields, the receiving antennas 31, 32 and 33 are preferably loop antennas. In the present case, it is also preferred that the receiving antennas 31, 32 and 33 span three dimensional space and conveniently, these antennas are disposed on three orthogonal axes X2, Y2 and Z2, respectively. In some embodiments of the invention, it may not be preferable to use three antennas, for example, two orthogonal antennas or an antenna structure which provided the equivalent of two independent components would be sufficient to create six signals from which the six position and orientation parameters of the sensor 30 could be derived. However, in the present case it is considered desirable to provide three orthogonal antennas to provide nine independent measures of the three electromagnetic fields transmitted by the source 10 from which the six independent position and orientation parameters are derived. The receiving antennas 31, 32 and 33 thus define a sensor reference coordinate frame identified by the axes X2, Y2 and Z2, respectively. The outputs of the antennas 31, 32 and 33 are inputted to a multiplexer 41 which in the present case is again preferably a time division multiplexer. In the case of time division multiplexing, it is normally preferable for the multiplexer 21 and the multiplexer 41 to be controlled by a common clock signal so that, for example, when the first source antenna 11 is excited, the components of the electromagnetic field generated by the first source antenna 11 received by each of the three orthogonal receiving antennas 31, 32 and 33 are identified. The output of the multiplexer 41 is then amplified at 42 and inputted to a synchronous demodulator at 43. The synchronous demodulator 43 provides a technique for demodulating the carrier in a way that preserves the sign of the incoming signal. The output of the synchronous demodulator 43 goes through a low pass filter 44 which smooths the signal providing a DC output. An analog to digital conversion is provided at 45. However, it should be appreciated that a state of the art signal processing chip could be used to replace the synchronous demodulator and the low pass filter. In this case, the A/D converter would precede the processing chip. The signal set from the analog to digital converter 45 is then inputted to a suitable processor 46 where the position and orientation parameters of the sensor 30 relative to the source 10 are determined. Normally, the processor 46 provides the clock signals for switching the multiplexers and adjusts the gain of the amplifiers and/or drivers to provide automatic gain control.

The remote object position and orientation determining system of the present invention has a wide variety of applications. For example, the sensor 30 can be associated with the stylus of a three dimensional digitizer which is used to trace a physical model or the like and generate a digital database. The resulting database can then be used to generate a wide variety of computer generated images of the physical model. For example, the database created by tracing the physical model may be used to develop engineering and layout drawings. In plant design for example, the database may be used to compile parts lists and may interface with additional software to accomplish various engineering tasks. Applications for such three dimensional digitizers are found in such diverse industries as architect engineering, shoe design and plastic bottle manufacturing. In another application, the digital databases created by tracing the physical models can be used to generate complex computer generated imagery in the film making art. In still another application, the sensor can be associated with a particular body part for the purpose of conducting biomechanical studies. In an important military application, the sensor is associated with the helmet and sighting reticle of the pilot of a military aircraft for determining the line of sight of the pilot to the target and thereafter initializing ordinance which is directed along the line of sight to the target. In the field of aviation generally, the system can be employed as an aircraft landing aid, the sensor being associated with the aircraft and the source reference coordinate frame being associated with a target landing area. Still another application involves the monitoring of the body movements of an invalid for the purpose of creating a nonverbal communication system or providing a technique for remotely controlling various devices with nonverbal communicative body motion. It should be appreciated that in many of these applications, the accuracy and speed of the processing technique for converting the signal set received by the remote object into remote object position and orientation is critical to the success of the application. This is particularly true, for example, in cases where the pilot of a military aircraft travelling at several hundred miles an hour is attempting to initialize ordinance to be delivered to a target within the reticle of his helmet mounted sight.

PROCESSING

Figure 2:
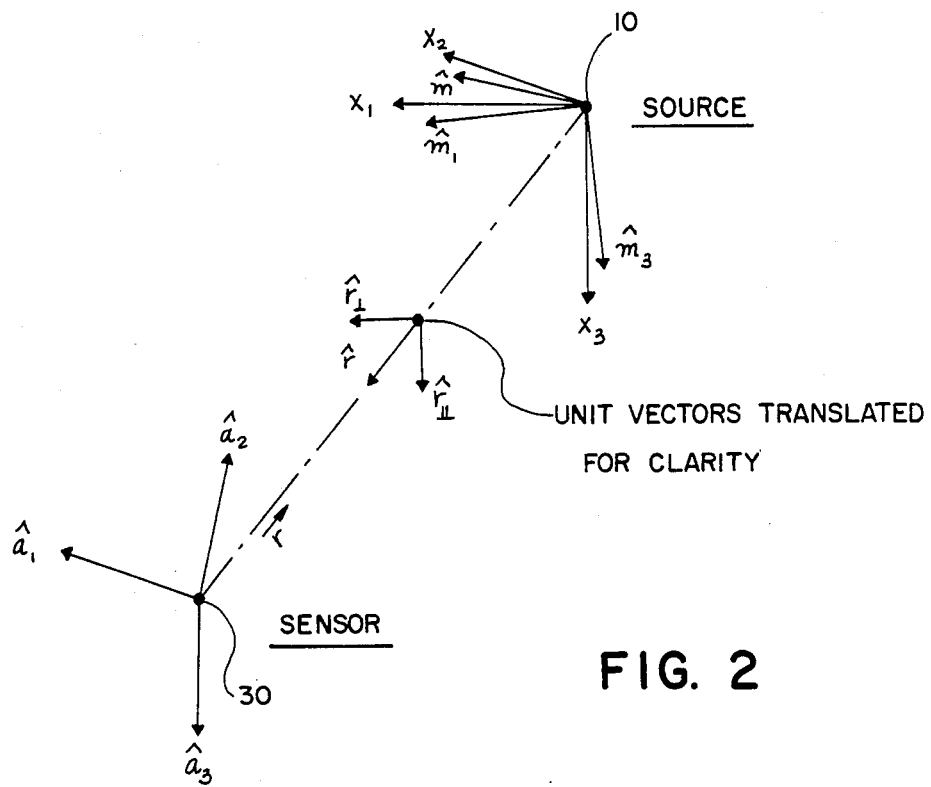
FIG. 2 is an illustration of the source and sensor of the present invention with the symbolic notation used in the processing strategy imposed thereon.

With reference now also to FIG. 2, the processing strategy begins with a signal matrix S which represents a total of nine measures of the three transmitted electromagnetic fields. The definitions of the symbols used in the processing technique are as follows. In this processing strategy the source 10 is taken as the reference point for a cartesian coordinate frame, although this is not a limitation of the algorithm derived.

$S = A \ 3 \times 3$ signal matrix.

$A = A \ 3 \times 3$ orthogonal matrix representative of the orientation of sensor.

$P = A$ position matrix described with three mutually orthogonal unit vectors $\hat{r}$, $\hat{r}_\perp$, $\hat{r}_{\perp\perp}$. The vector $\hat{r}$ points at the sensor, see FIG. 2.

$X_1, X_2, X_3 = $ the source reference coordinate frame $m_1, m_2, m_3 = $ the axes of the source triad $a_1, a_2, a_3 = $ the axes of the sensor triad $\bar{r} = $ the position of the sensor $\hat{r} = $ the unit vector $$\frac{\bar{r}}{|\bar{r}|}$$

$\hat{r}_\perp = $ the unit vector $\perp$ to $\hat{r}$ $\hat{r}_{\perp\perp} = $ the unit vector $\perp$ to $\hat{r}$ and $\hat{r}_\perp$ $A = [\hat{a}_1 | \hat{a}_2 | \hat{a}_3]$ Again, it should be noted that here the axes of the sensor and source triads are assumed to be orthogonal. However, this is not a limitation of the processing technique for the nonorthogonalities can be calibrated and compensation can be applied by the processor.

$P = [\hat{r} | \hat{r}_\perp | \hat{r}_{\perp\perp}]$ $M = [\hat{m}_1 | \hat{m}_2 | \hat{m}_3] = $ the source coil magnetic moment $H = $ the field coupling matrix which in the case of a near field coupling:

$$H = \begin{bmatrix} 1 & 0 & 0 \\ 0 & -\frac{1}{2} & 0 \\ 0 & 0 & -\frac{1}{2} \end{bmatrix}$$

It should be appreciated that if the system operates under other field conditions, such as far-field, this coupling will change. The formulation of such couplings is well-known by those skilled in the art. and k=a constant determined by consideration of physical constants, sensor sensitivity, source magnetic moment and amplifier gain. It is assumed to be unity for the simplification of the math presented.

We know from previous remote object position and orientation analysis employing electromagnetic couplings that:

$$S = (k/r^3) A^T P H P^T M$$

where the T notation designates the transpose of a matrix.

With the source coil magnetic moment M known, the process begins by computing:

$$S M^{-1} = (k/r^3) A^T P H P^T$$

to simplify notation let M=I (the identity matrix) and k=1 then $$S = 1/r^3 A^T P H P^T$$

Find $B = S^T S = (1/r^6) P H^2 P^T = (1/4 r^6)(3 \hat{r} \hat{r}^T + \bar{I})$
find $\vec{u} = B \hat{r}_{t-1}$ where $\hat{r}_{t-1}$ is the last computed $\hat{r}$ and $\hat{r}_t$ is the current $\hat{r}$.
normalize u and find the position unit vector (see Smoothing below) (solving two of the six degrees of freedom):

$$r = \frac{1}{|u|} u$$

find $P H^{-1} P^T$ where $$P H^{-1} P^T = 3 \hat{r} \hat{r}_t^T - 2I$$

find $C_T = S P H^{-1} P^T = (1/r^3) A^T$
build the 4×4 matrix Q as follows:

between the t and t−1 vectors. (which could occur if the t−1 vector was fixed or arbitrary).

Normalize $\vec{V}$ to determine attitude (solving three of the six degrees of freedom):

$$\vec{q_t} = \frac{1}{|V|} \vec{V}$$

find range (solving for the final of the six degrees of freedom):

$$r = \sqrt[4]{\frac{3}{|V|}} \; ; \text{and}$$

find position where:

$$\vec{r} = \pm r \hat{r}$$

Note that the ± can not be resolved. This is a limitation of the physics or structure of the electromagnetic fields. User must keep $\hat{r}$ inside a hemisphere centered on the origin or source. There will always be a hemispherical ambiguity that cannot be resolved without further information because a sensor displaced about the origin 180° will produce the same signal set.

As noted earlier, the algorithms listed above can be used with a wide variety of position and orientation determining hardware in any one of a number of diverse applications requiring a full six degrees of freedom. The important features of these algorithms are their inherent simplicity, the fact that fewer steps in immediate processes are required to converge upon position and orientation parameters, the processing technique is a best fit in the root means square (rms) sense, the processing technique is completely free from discontinuities, the processing technique is non-iterative in the traditional sense, there are no transcendentals, and linear algebra is used with a minimum base set, namely, quaternions. The algorithm uses quaternions for attitude while employing cartesian coordinates for position. All of the algrebra is linear and the technique is not limited to a small angle approximation. The processing technique is truly all attitude and all position.

$$S^T S = \frac{1}{r^6} P H^2 P^T = \frac{1}{r^6} \left( \frac{3 \hat{r} \hat{r} + \bar{I}}{4} \right)$$

$$Q = \begin{bmatrix} \frac{1}{r^3} + C_{11} + C_{22} + C_{33} & C_{32} - C_{23} & C_{13} - C_{31} & C_{21} - C_{12} \\ C_{32} - C_{23} & \frac{1}{r^3} + C_{11} - C_{22} - C_{33} & C_{12} - C_{21} & C_{13} + C_{31} \\ C_{13} - C_{31} & C_{12} + C_{21} & \frac{1}{r^3} - C_{11} + C_{22} - C_{33} & C_{23} + C_{32} \\ C_{21} - C_{12} & C_{13} + C_{31} & C_{23} + C_{32} & \frac{1}{r^3} - C_{11} - C_{22} + C_{33} \end{bmatrix}$$

Note: $\frac{1}{r^3} \sqrt{\frac{2}{3} \text{Trace}(B)} = \frac{|\vec{V}|}{3}$ (below in smoothing)

find $\vec{V} = Q \vec{q}_{t-1}$ where $\vec{q}_{t-1}$ is the last computed quaternion and $\vec{q}_t$ is the current $\vec{q}_t$.

While reference is made in the processing to the last computed quaternion q and the last computed position r this is only done to preclude incidental orthogonality Let $\hat{r}$ present be designated as $\hat{r}_t$ and $\hat{r}$ previous be designated as $\hat{r}_{t-1}$
Then:

$$S^T S \hat{r}_{t-1} = \frac{1}{\rho^6} \left( \frac{3\hat{r}_t \hat{r}^T \hat{r}_{t-1} + \hat{r}_{t-1}}{4} \right) = \frac{1}{\rho^6} \left( \frac{3\hat{r}_t^T \hat{r}_{t-1} \hat{r}_t + \hat{r}_{t-1}}{4} \right)$$

But $\hat{r}_t^T \hat{r}_{t-1}$ is just dot product between $\hat{r}_t$ and $\hat{r}_{t-1}$. Call it $\alpha$.

$$S^T S \hat{r}_{t-1} = \frac{1}{\rho^6} \left( \frac{3\alpha \hat{r}_t + \hat{r}_{t-1}}{4} \right) = \vec{u}$$

Notice $\vec{u}$ has roughly 3 parts $\hat{r}_t$ and 1 part $\hat{r}_{t-1}$ which provides some smoothing (also lag). An alternative solution is to subtract some portion of $\hat{r}_{t-1}$, for example, if we subtract the whole amount then the direction of $\vec{u}$ is determined in whole by $\hat{r}_t$. One way to do this is as follows:

Form $S^T S$ as before $$B = S^T S = \frac{1}{\rho^6} \left( \frac{3\hat{r} \hat{r}^T + I}{4} \right)$$

Find trace $(B) = \frac{1}{\rho^6} \cdot \frac{3}{2} = T$

Form $C = S^T S - \frac{T}{6} \cdot \bar{I} = \frac{1}{\rho^6} \cdot \frac{3}{4} \hat{r}_t \hat{r}_t^T$ Form $C\hat{r}_{t-1} = \frac{1}{\rho^6} \cdot \frac{3}{4} \hat{r}_t^T \hat{r}_{t-1} \hat{r}_t = \frac{1}{\rho^6} \cdot \frac{3\alpha}{4} \hat{r}_t = \vec{u}$ $\hat{r}_t = |\vec{u}|^{-1} \vec{u}$ This $r_t$ has no smoothing, thus no lag. Obviously, any portion of T can be subtracted from $S^T S$ yielding any desired amount of smoothing. Smoothing may be desirable because it lessens the effects of noise by averaging the noise effect, but there is a trade-off because it slows down the processing technique by creating lag. It is important, however, that the present processing technique uniquely lends itself to the blending in of a variable amount of the $t-1$ solution thus varying the smoothing as desired for a particular application.

DEVELOPMENT OF QUATERNION q

Any general textbook on mechanics and quaternions can be used, for example, see pages 320 et. seq. in Vol. 3, 2nd edition of *Mathematics Its Content, Methods and Meaning* by the M.I.T. Press, published in 1969. The disclosures of volumes 1, 2 and 3 of this publication are hereby incorporated by reference. Historically, the first hypercomplex system of numbers that was discussed in mathematics is the system of quaternions, i.e., "four-fold numbers" which was introduced by the Irish mathematician Hamilton. Quaternions can be described as follows. For the quadruplets (1,0,0,0), (0,1,0,0), (0,0,1,0), (0,0,0,1) we introduce the abbreviations 1, i, j, k. Then by the equation:

$$(q_0, q_1, q_2, q_3) = q_0(1,0,0,0) + q_1(0,1,0,0) + q_2(0,0,1,0) + q_3(0,0,0,1)$$

Every quaternion can be uniquely represented by the form:

$$(q_0, q_1, q_2, q_3) = q_0 1 + q_1 i + q_2 j + q_3 k$$

Q as earlier defined is developed as follows. Generally, any orthogonal matrix A ($A^T = A^{-1}$) can be expressed in terms of a quaternion q where:

$$A = \begin{bmatrix} q_0^2 + q_1^2 - q_2^2 - q_3^2 & 2(q_0 q_3 + q_1 q_2) & 2(q_1 q_3 - q_0 q_2) \\ 2(q_1 q_2 - q_0 q_3) & q_0^2 - q_1^2 + q_1^2 - q_3^2 & 2(q_1 q_0 + q_3 q_2) \\ 2(q_1 q_3 + q_0 q_2) & 2(q_2 q_3 - q_0 q_1) & q_0^2 - q_1^2 - q_2^2 + q_3^2 \end{bmatrix}$$

Where the norm of quaterion N(q) is assumed to be unity. The norm is defined as the sum of the square of the four elements. When the norm of the quaternion is unity the quaternions are often referred to as Euler Parameters.

Now consider that A is only nearly orthogonal. What choice of q best represents A in a least RMS sense.

Taking suitable $(\partial / \partial)_{q_i}$, setting these to zero leads to the following nonlinear equation:

$$\begin{bmatrix} a_{11} + a_{22} + a_{33} & a_{23} - a_{32} & a_{31} - a_{13} & a_{12} - a_{21} \\ a_{23} - a_{32} & a_{11} - a_{22} - a_{33} & a_{12} + a_{21} & a_{13} + a_{31} \\ a_{31} - a_{13} & a_{12} + a_{21} & -a_{11} + a_{22} - a_{33} & a_{23} + a_{32} \\ a_{12} - a_{21} & a_{13} + a_{31} & a_{23} + a_{32} & -a_{11} - a_{22} + a_{33} \end{bmatrix} [q] = 3N(q)[q]$$

Let the notation [q] represent a column vector, $$[q] = \begin{bmatrix} q_0 \\ q_1 \\ q_2 \\ q_3 \end{bmatrix}$$

N(q) is the quaternion norm:

$$N(q) = \sum_{i=0}^{3} q_i^2 = [q]^T [q]$$

If we add 1 to the diagonal terms of the 4×4 matrix an interesting result occurs; the matrix takes on the form:

$$[4q_0 [q] | 4q_1 [q] | 4q_2 [q] | 4q_3 [q]]$$

This is done directly by writing out each term in 4×4 matrix. Then note that this can be written as:

$$4[q][q]^T = Q$$

And now add the t&t−1 nomenclature to designate present and previous quaternions and we have:

$$[q]_t[q]_t^T[q]_{t-1} = N(q)_{t-1}[q]_{t-1}$$

as the equation to solve to find a least RMS solution.

Inspection of $[q]_t^T[q]_{t-1}$ shows that this is just the dot product between the two 4 element vectors—call it $\beta$.

Hence $\beta[q]_t = N(q)_{t-1}[q]_{t-1}$

In other words, post multiplying $\tilde{Q}$ by $[q]_{t-1}$ leads to a vector $\beta[q]_t$ but has a norm not necessarily unity. Solving for $\beta$, then normalizing leads to $[q]_t$. Again, while this solution appears to be iterative, reference is made to the $t-1$ solution only to preclude incidental orthogonality. The sensitivity to $[q]_{t-1}$ is proportional to the dot product between $[q]_t$ and $[q]_{t-1}$ and is therefore sensitive to $\cos(\epsilon)$ where $\epsilon$ is the angle between $[q]_t$ and $[q]_{t-1}$ in four dimensional space and this sensitivity is on the norm $\beta$ which cancels in any case to the first order.

The quaternion q can be smoothed similar to the manner in which we smoothed the position r. Notice that by adding 1 to the diagonal of the 4×4 matrix, we derived earlier, we arrived at Q and $[q]_t$, the new or current quaternion. On the other hand if we do not add 1, we get a solution that is part of the t and t−1 solutions. This is like the position solution and similarly uniquely lends itself to a selective blending of the t and t−1 solutions for the quaternion q to provide smoothing:

$$Q[q]_{t-1} = 4N(q)_{t-1}[q]_{t-1}$$

$$[Q - I][q]_{t-1} = 3 N(q)_{t-1}[q]_{t-1}$$

$$4\beta[q]_t - [q]_{t-1} \rightarrow$$

A new vector having some of the old and some of the new.

Thus smoothing can be selected as required.

The equation for Q presented earlier in the processing section has $(1r^3)$ term added to the diagonal to account for the scaling, and hence that equation has no smoothing.

ALTERNATIVE PROCESSING TECHNIQUES

In alternative embodiments of the invention after $PH^{-1}P^T$ is formed and the signal set S is post multiplexed by $PH^{-1}P^T$ to create a matrix X, it may be desirable to build $A_{t-1}$ from the old $q_{t-1}$ and then multiply the result by X to formulate a $\Delta A$ or net change in attitude in terms of quaternions or $\Delta q$. After extracting the $\Delta q$ terms from the expression for $\Delta A$, $\Delta q$ is multiplexed by $q_{t-1}$ to form $q_t$ or the current quaternion representation of the orientation of the sensor relative to the source coordinate frame. Note again the absence of any small angle approximation. This results in a fast continuous closed form solution.

More specifically, this alternative processing technique involves the steps of forming:

$$X = SPH^{-1}P^T$$

Form $A_{t-1}$ from the previous expression of A in terms of q found in the smoothing section.

Form: $\Delta A = A_{t-1}^T X$

Where $\Delta A$ is a measure of difference between present and past attitude solutions.

Extract $\Delta q$ from $\Delta A$ as follows:

Calculate ½ Euclidean norm of $\Delta A$ $$\text{let } \epsilon = \tfrac{1}{2} \sqrt{\sum_{i,j} (A_{ij})^2}$$

Calculate trace of $\Delta A$ (trace is defined as the sum of the diagonal terms). If this is positive then use formula 1. If the trace is negative use formula 2, 3, or 4 depending on which diagonal term in A is the largest; i.e., if $\Delta A_{11}$ is largest use 2
$\Delta A_{22}$ is largest use 3
$\Delta A_{33}$ is largest use 4

FORMULA 1

$\Delta q_0 = \text{trace} + \epsilon$ $\Delta q_1 = -\Delta A_{23} + \Delta A =$ $\Delta q_2 = -\Delta A_{31} + \Delta A_{13}$ $\Delta q_3 = -\Delta A_{12} + \Delta A_{21}$

FORMULA 2

$\Delta q_0 = -\Delta A_{23} + \Delta A_{32}$ $\Delta q_1 = \epsilon + \Delta A_{11} - \Delta A_{22} - \Delta A_{33}$ $\Delta q_2 = \Delta A_{12} + \Delta A_{21}$ $\Delta q_3 = \Delta A_{13} + \Delta A_{31}$

FORMULA 3

$\Delta q_0 = -\Delta A_{31} + \Delta A_{13}$ $\Delta q_1 = \Delta A_{12} + \Delta A_{21}$ $\Delta q_2 = \epsilon - \Delta A_{11} + \Delta A_{22} - \Delta A_{33}$ $\Delta q_3 = \Delta A_{23} + \Delta A_{32}$

FORMULA 4

$\Delta q_0 = -\Delta A_{12} + \Delta A_{21}$ $\Delta q_1 = \Delta A_{13} + \Delta A_{31}$ $\Delta q_2 = \Delta A_{23} + \Delta A_{32}$ $\Delta q_3 = \epsilon - \Delta A_{11} - \Delta A_{22} + \Delta A_{33}$ Now update $q_{t-1}$:

$$q_t = \Delta q \cdot q_{t-1}$$

This is a quaternion multiplication.

Finally, normalize $q_t$ to unit norm.

This method of computing $q_t$ has been implemented. It has the disadvantage of more steps; however, it has an advance in aperture compensation by saving one matrix multiplication. More particularly, in the aperture compensation section, there is an expression for the B field. In order to generate $\Delta S$, B must be multiplied by $A^T_{t-1}$, as already noted. But because the alternative method presently under discussion for computing $q_t$ involves a multiplication by $A^T_{t-1}$ in order to find $\Delta A$, this obviates doing it again for aperture compensation.

In summary, both methods are accurate, and depending on programming skill one or the other might actually run faster. There is no clear advantage to either solution when aperture compensation is applied.

APERTURE COMPENSATION

I. Introduction

In remote object orientation and position determining systems, triads of magnetic source and sensing coils between 1 and 5 cm in diameter are used to generate and detect low frequency magnetic fields. The detected signals are used to measure the six degrees of freedom of one antenna triad relative to the other. In the equations describing the physics of this situation, both source and sensor coils are modeled as infinitesimal dipoles. Measurement errors due to this approximation are noticed at sensor-radiator separation of as little as 45 cm and are quite bad at 20 cm. For this reason, prior art systems usually specify accuracy starting at 20 cm or greater and go out to some maximum where the particular system becomes signal to noise limited. Whenever the "aperture", or coil diameter, is comparable to the distance separating source and sensor, equations other than an infinitesimal dipole approximation must be used to avoid measurement errors.

Equations for a loop cannot be expressed in closed form. However, they can be expressed as an infinite series or in terms of eliptic integrals. The first two terms of an infinite series describing a loop has been successfully used to model a magnetic dipole radiator and has demonstrated improved accuracy. The theory presented here provides the details for modeling to any general degree and may be employed to improve accuracies for either very close range or for larger coil assemblies.

II. Current Loop B Field

An excellent derivation of the magnetic B field due to a current loop can be found in Arfken's *Mathematical Methods for Physicists*, AP, 1968, page 439–443. In this case, the current loop is in the Z=0 plane and has a coil radius of "a", and current I positive about the Z-axis in a right hand sense. The author derives the $\vec{A}$ vector potential in terms of Legendre polynomials and proceeds to find the $\vec{B}$ field from the curl of $\vec{A}$. The two components of $\vec{B}$, the radial component $B_r$ and the tangential component $B_\theta$, are found to be, $$B_r = \frac{\mu_0 I}{2\pi} \frac{a^2}{r^3} \left[ P_1 - \frac{3}{2}\left(\frac{a}{r}\right)^2 P_3 + \dots \right]$$

$$B_\theta = \frac{\mu_0 I}{4\pi} \frac{a^2}{r^3} \left[ P_1^1 - \frac{3}{4}\left(\frac{a}{r}\right)^2 P_3^1 + \dots \right]$$

In these expressions the $P_i$ and $P_i^j$ are the ordinary and associated Legendre polynomials, respectively. For their definitions see the text noted above.

If r and $\theta$ represent unit vectors in the r and $\theta$ directions, respectively, then the vector $\vec{B}$ field can be written as $$\vec{B} = B_r \hat{r} + B_\theta \hat{\theta}$$

Referring to previous notation, the source coil's orientation is arbitrary and is given by the unit vector M.

Substitutions for $\cos \theta \, r$ and $\sin \theta \theta$ are made with the following result.

$$\cos \theta \hat{r} = \hat{M} \cdot \hat{r}\hat{r} = \hat{M}^I \hat{r}\hat{r} = \hat{r}\hat{r}^T \hat{M} = R\hat{M}$$

$$\sin \theta \hat{\theta} = \hat{M} \cdot \hat{r}\hat{r} - \hat{M} = (R - I)\hat{M}$$

The arguments for the Legendre polynomials are $r^t M$. Using these substitutions leads to $$B = \frac{\mu_0 I}{4\pi} \frac{a^2}{r^3} \left\{ 2R \left[ \frac{P_1}{\cos\theta} - \frac{3}{2}\left(\frac{a}{r}\right)^2 \frac{P_3}{\cos\theta} + \dots \right] \hat{M} + (R - I) \left[ \frac{P_1^1}{\sin\theta} - \frac{3}{4}\left(\frac{a}{r}\right)^2 \frac{P_3^1}{\sin\theta} + \dots \right] \hat{M} \right\}$$

Letting $\vec{M}$ represent the magnetic moment, $$\vec{M} = \pi a^2 I \hat{M}$$

we arrive at a general expression for the vector $\vec{B}$ field.

$$B = \frac{\mu_0}{4\pi} \frac{1}{r^3} \left\{ 2R \left[ \frac{P_1}{\cos\theta} - \frac{3}{2}\left(\frac{a}{r}\right)^2 \frac{P_3}{\cos\theta} + \dots \right] + (R - I) \left[ \frac{P_1^1}{\sin\theta} - \frac{3}{4}\left(\frac{a}{r}\right)^2 \frac{P_3^1}{\sin\theta} + \dots \right] \right\} \vec{M}$$

III. Eigenvalues of $nR - I$

The B field equation can be put into a more useful form by finding the eigenvalues of $nR - I$. In order to solve for the eigenvalues $\lambda_i$ and eigenvector $\hat{P}_i$, first form the secular equation $$\text{determinant } [nR - I - \lambda I] = 0$$

substitute, $$\lambda' = \frac{\lambda + 1}{n}$$

and solve.

$$\det \left[ R - \frac{\lambda + 1}{n} I \right] = \det [R - \lambda' I] = 0$$

The solutions are $$\lambda' = 1, 0, 0$$

or $$\lambda = n - 1, -1, -1$$

Next, define an eigenvalue matrix $H_n$, $$H_n = \begin{bmatrix} n-1 & 0 & 0 \\ 0 & -1 & 0 \\ 0 & 0 & -1 \end{bmatrix}$$

The eigenvector $\hat{P}_1$ corresponding to the eigenvalue $\lambda_1 = n-1$, is a unit vector which points from source to sensor. Eigenvectors $\hat{P}_2$ and $\hat{P}_3$ correspond to the repeated roots $\lambda_2 = \lambda_3 = 0$. Naturally $\hat{P}_1$, $\hat{P}_2$, $\hat{P}_3$ are mutually orthogonal. Note however that $\hat{P}_2$ and $\hat{P}_3$ are not unique due to the repeated root.

Let the matrix P be defined by the three eigenvectors $\hat{r}$, $\hat{r}_\perp$ and $\hat{r}_{\perp\perp}$.

$$P = [\hat{r} \mid \hat{r}_\perp \mid \hat{r}_{\perp\perp}]$$

Then the matrix $nR - I$ may be written as, $$nR - I = P H_n P^T$$

Note that the eigenvectors are independent of n.

IV. Factored Legendre Polynomials

The Legendre polynomials referenced here are both ordinary and associated. Note that only the odd indexed polynomials appear, and of the associated, only superscript 1 appears. All odd ordinary polynomials contain a factor of $\cos\theta$, while all associated have a factor of $\sin\theta$. For convenience, we define a factored Legendre polynomial Q as, $$\left. \begin{array}{l} Q_L(\cos\theta) = \frac{1}{\cos\theta} P_L(\cos\theta) \\ Q_L^1(\cos\theta) = \frac{1}{\sin\theta} P_L^1(\cos\theta) \end{array} \right\} L \in \{1,3,5,\ldots\}$$

The $\vec{B}$ field can be written using these definitions as shown below.

$$\vec{B} = \frac{\mu_0}{4\pi} \frac{1}{r^3} \left\{ 2R \left[ Q_1 - \frac{3}{2}\left(\frac{a}{r}\right)^2 Q_3 + \ldots \right] + (R - I)\left[ Q_1^1 - \frac{3}{4}\left(\frac{a}{r}\right)^2 Q_3^1 + \ldots \right] \right\} \vec{M}$$

A table of the first few $Q_L$ and $Q_L^1$ polynomials are included for reference. The argument X has been substituted for $\cos\hat{\theta} = \hat{M}\cdot\hat{r}$.

| L | $Q_L$ | $Q_L^1$ |
|---|---|---|
| 1 | 1 | 1 |
| 3 | $\frac{1}{2}(5X^2 - 3)$ | $\frac{3}{2}(5X^2 - 1)$ |
| 5 | $\frac{1}{8}(63X^4 - 70X^2 + 15)$ | — |

This equation can be written compactly as follows:

$$\vec{B} = \frac{\mu_0}{4\pi} \frac{1}{r^3} \left( 2R \sum_{(\text{odd } L)} b_L Q_L + (R - I) \sum_{(\text{odd } L)} d_L Q_L^1 \right) \vec{M}$$

$$= \frac{\mu_0}{4\pi} \frac{1}{r^3} \sum_{(\text{odd } L)} \{(2 b_L Q_L + d_L Q_L^1)R - d_L Q_L^1 I\} \vec{M}$$

The equations for $b_L$ and $d_L$ can be found in Arfken. Employing equation (16), we write in compact form, $$\vec{B} = \frac{\mu_0}{4\pi} \frac{1}{r^3} P \sum_{(\text{odd } L)} \begin{bmatrix} 2b_L Q_L & 0 & 0 \\ 0 & -d_L Q_L^1 & 0 \\ 0 & 0 & -d_L Q_L^1 \end{bmatrix} P^T \vec{M}$$

Next, write out all the terms of equation (21) explicitly, then group them on index L, noting that the $b_L$ and $d_L$ terms contain an explicit $r^{1-L}$ dependancy. Within each L group, form subgroups based on powers of $r^tM$. The task can be simplified by letting $$\Lambda = \begin{bmatrix} \hat{r}^T \hat{M}_1 & 0 & 0 \\ 0 & \hat{r}^T \hat{M}_2 & 0 \\ 0 & 0 & \hat{r}^T \hat{M}_3 \end{bmatrix}$$

and adding the subscript "n" to account for the terms of each Legendre polynomial. Thus from equation (21) we write $$\vec{B} = \frac{\mu_0}{4\pi r^3} \sum_{(\text{odd } L)} \sum_{n=0}^{\frac{1}{2}(L-1)} \{(2b_{Ln}(\hat{r}^T\hat{M})^{2n} + d_{Ln}(\hat{r}^T\hat{M})^{2n})R - d_{Ln}(\hat{r}^T\hat{M})^{2n} I\}\vec{M}$$

For a triad of radiator coils this becomes $$B = \frac{\mu_0}{4\pi r^3} \sum_{(\text{odd } L)} \sum_{n=0}^{\frac{1}{2}(L-1)} P\, H_{Ln}\, P^T M\, \Lambda^{2n}$$

where $$H_{Ln} = \begin{bmatrix} 2b_{Ln} & 0 & 0 \\ 0 & -d_{Ln} & 0 \\ 0 & 0 & -d_{Ln} \end{bmatrix}$$

For example let the sum on L be from $L=1$ to $L=3$. Then assume that the radius of each radiator coil is equal to "a." Then $$B = \frac{\mu_0}{4\pi r^3} P \left\{ H_3 - \frac{9}{8}\left(\frac{a}{r}\right)^2 \left[ 5 H_{\frac{7}{3}} P^T M\, A^2 M^{-1} P - H_5 \right] \right\} P^T M$$

The $PH_3P^TM$ terms are the dipole approximation used in the prior art. The remaining terms represent the effect of the second term of the infinate series representing the loop. The second term being the most significant term of the series. This correction term is calculated for the previous (t−1) solution and subtracted from the signal matix to compensate for aperture effects. It should be understood that if more accuracy is required more terms of the series will be considered, or the series can be evaluated as an eliptic integral.

V. Sensor Aperture Compensation

Only equations for radiator aperture have been discussed up to this point. But since sensor coils are of finite size, they too have an aperture effect and depending on their size may require compensation. The easiest way to develop sensor equations is to invoke reciprocity. Reciprocity states that a physical symmetry exists between sensor and radiator coils which allows them to interchange rolls, i.e. the radiator can be used to sense, and the sensor can be used to generate the field. Yet the equations describing their coupling remains unchanged. This is equivalent to saying that the mutual inductance between two coils is independent of which one of the coils is excited for the mutual inductance measurement.

We begin the analysis for a finite radiator and infinitesimal sensor by writing the voltage V matrix:

$$V = A^T B$$

The matrix $\bar{S}$ consists of three sense vectors, $$A = [\bar{a}_1 | \bar{a}_2 | \bar{a}_3]$$

Substituting for B from equation (25) we have $$V = \frac{\mu_0}{4\pi r^3} \sum_L \sum_n A^t PH_{Ln} P^t M \, A^{2n}$$

Interchanging S for M leads to $$V = \frac{\mu_0}{4\pi r^3} \sum_L \sum_n \Gamma^{2n} A^t PH_{Ln} P^T M$$

where, $$\Gamma = \begin{bmatrix} \hat{r}^T \hat{a}_1 & 0 & 0 \\ 0 & \hat{r}^T \hat{a}_2 & 0 \\ 0 & 0 & \hat{r}^T \hat{a}_3 \end{bmatrix}$$

Finally, the example of section V can be extended to incorporate the L=3 term of both the sensor and radiator with the following results. The terms shown are often pre and post multiplication of $P^T A^{-T}$ and $M^{-1}P$ respectively.

$$\frac{4\pi r^3}{\mu_0} P^T AVM^{-1}P \simeq H_3 -$$

$$\frac{9}{8}\left(\frac{a}{r}\right)^2 [5 H_{7/3} (M^{-1}P)^T A^2 (M^{-1}P) - H_5] -$$

$$\frac{9}{8}\left(\frac{b}{r}\right)^2 [5(P^T A^{-T}) \Gamma^2 (P^T A^{-T})^t H_{7/3} - H_5]$$

Like the previous discussion this expression now includes the next most significant terms of the series expansion for source aperture effects and sensor aperture effects and either one can be expanded to include more significant terms.

The above description should be considered as exemplary and that of the preferred embodiment only. Modifications of the invention will occur to those skilled in the art. The true scope and spirit of the present invention is to be determined with reference to the appended claims. It is desired to include within the scope of the present invention all such modifications that come within the proper scope of the appended claims.

The embodiments of the invention in which an exclusive property or privilege is claimed are defined as follows:

1. An apparatus for determining the position and orientation of a remote object relative to a reference coordinate frame comprising:

a plurality of radiating means for radiating electromagnetic energy, said radiating means having independent components defining a source reference coordinate frame;

a transmitter means for applying to said plurality of radiating means electrical signals which generate a plurality of radio frequency electromagnetic fields, said electromagnetic fields being distinguishable from one another;

a plurality of receiving means for receiving said transmitted electromagnetic fields, said receiving means being disposed on a remote object and said receiving means having independent components for detecting each of said transmitted electromagnetic fields and defining a sensor reference coordinate frame; and analyzing means for receiving the output of said receiving means and converting the components of said transmitted electromagnetic fields received by said receiving means into remote object position and orientation relative to said source reference coordinate frame, said analyzing means including processing means for processing the components of said electromagnetic fields into remote object orientation using quaternions and blending means for blending a prior solution for said orientation into a new solution for said orientation.

2. The apparatus of claim 1 wherein said radiating means each comprise a dipole antenna and said analyzing means further comprises radiator aperture compensation means for compensating for distortion in the dipole fields caused by the size of the radiating antennas relative to the separation distance between said radiating means and said receiving means.

3. The apparatus of claim 2 wherein said receiving means each comprise a dipole antenna and said analyzing means further comprises receiver aperture compensation means for compensating for distortion in the received components of said electromagnetic fields caused by the size of the receiving antennas relative to the separation distance between said radiating means and said receiving means.

4. The apparatus of claim 1 wherein said analyzing means further comprises means for processing the components of said electromagnetic fields into remote object position and means for blending an old solution for position into a new solution for position.

5. A method for determining the position and orientation of a remote object relative to a reference coordinate frame comprising:

providing a source of electromagnetic radiation including a plurality of radiating means for radiating electromagnetic energy, said radiating means having independent components defining a source reference coordinate frame;

applying multiplexed electrical signals to said radiating means and thus transmitting a set of distinguishable electromagnetic fields;

providing a sensor including a plurality of receiving means disposed on a remote object for defining a sensor reference coordinate frame, receiving said electromagnetic fields and generating a set of signals that is representative of the received components of said electromagnetic fields;

processing the components of said electromagnetic fields into remote object orientation using quaternions; and blending a prior solution for orientation into a new solution for said orientation.

6. The method of claim 5 further including the method steps of providing a plurality of dipole radiating antennas and compensating for distortion in the dipole field created when the size of the radiating antennas is significant relative to the separation distance between the source and the sensor.

7. The method of claim 6 further including the method steps of providing a plurality of dipole receiving antennas and compensating for distortion caused when the size of the receiving antenna is significant relative to the separation distance between the source and the sensor.

8. The method of claim 5 further including the steps of processing the components of said electromagnetic fields into remote object position and blending an old solution for position into a new solution for position.

9. A method for determining the position and orientation of a remote object relative to a reference coordinate frame comprising:

providing a source of electromagnetic radiation including a plurality of radiating means for radiating electromagnetic energy, said radiating means having independent components defining a source reference coordinate frame;

applying multiplexed electrical signals to said radiating means and thus transmitting a set of distinguishable electromagnetic fields;

providing a sensor including a plurality of receiving means disposed on a remote object for defining a sensor reference coordinate frame, receiving said electromagnetic fields and generating a set of signals that is representative of the received components of said electromagnetic fields; and processing the components of said electromagnetic fields into remote object position and orientation by:

establishing a signal matrix S representative of the received components of said electromagnetic fields;

finding $S^T S$ and normalizing to determine the position unit vector $\hat{r}$;

forming $PH^{-1}P^T$;

post multiplying the signal matrix S by said $PH^{-1}P^T$ and building a 4×4 matrix Q;

finding $\overline{v} = Q\bar{q}_{t-1}$ where q is a quaternion representing orientation and $q_{t-1}$ is the last computed quaternion;

normalizing said $\overline{v}$ to determine the orientation vector; and determining range r from $$r = \sqrt[4]{\frac{3}{|\overline{v}|}}$$

10. The method of claim 9 further including the step of introducing a smoothing factor for r after said step of find $S^T S$.

11. The method of claim 9 further including the step of compensating for aperture effects by subtracting the aperture effect terms from the signal matrix S just after said step of establishing the signal matrix.

12. An apparatus for determining the position and orientation of a remote object relative to a reference coordinate frame comprising:

a plurality of radiating means for radiating electromagnetic energy, said radiating means having independent components defining a source reference coordinate frame;

a transmitter means for applying to said plurality of radiating means electrical signals which generate a plurality of electromagnetic fields, said electromagnetic fields being distinguishable from one another;

a plurality of receiving means for receiving said transmitted electromagnetic fields, said receiving means being disposed on a remote object and said receiving means having independent components for detecting each of said transmitted electromagnetic fields and defining a sensor reference coordinate frame; and analyzing means for receiving the output of said receiving means and converting the components of said transmitted electromagnetic fields received by said receiving means into remote object position vector $\hat{r}$, orientation vector v and range value r relative to said source reference coordinate frame, said analyzing means including means for establishing a signal matrix S representative of the received components of said electromagnetic fields, means for determining $S^T S$ and normalizing to determine said position vector $\hat{r}$, means for forming $PH^{-1}P^T$, means for post multiplying the signal matrix S by said $PH^{-1}P^T$ and building a 4×4 matrix Q, means for determining $\overline{v} = Q\bar{q}_{t-1}$ were q is a quaternion representing orientation and $q_{t-1}$ is the last computed quaternion, means for normalizing $\overline{v}$ to determine said orientation vector $\hat{v}$ and means for determining said range value r according to $$r = \sqrt[4]{\frac{3}{|\overline{v}|}}$$

13. The apparatus of claim 13 further comprising means for introducing a smoothing factor for said position vector r.

14. The apparatus of claim 13 further comprising means for compensating for aperture effects, said compensating means including means for subtracting the aperture effect terms from said signal matrix S.

15. A method for determining the position and orientation of a remote object relative to a reference coordinate frame comprising:

providing a source of electromagnetic radiation including a plurality of radiating means for radiating electromagnetic energy, said radiating means having independent components defining a source reference coordinate frame;

applying multiplexed electrical signals to said radiating means and thus transmitting a set of distinguishable electromagnetic fields;

providing a sensor including a plurality of receiving means disposed on a remote object for defining a sensor reference coordinate frame, receiving said electromagnetic fields and generating a set of signals that is representative of the received components of said electromagnetic fields; and processing the components of said electromagnetic fields into remote object position and orientation by:

establishing a signal matrix S representative of the received components of said electromagnetic fields, finding $S^TS$ and normalizing to determine the position unit vector $\hat{r}$, forming $PH^{-1}P^T$, post multiplying the signal matrix S by said $PH^{-1}P^T$ to form a matrix $X = SPH^{-1}P^T$, forming $\Delta A = A_{t-1}{}^T X$, where A is a matrix representing orientation and $A_{t-1}$ is the last computed orientation matrix, extracting $\Delta q$ from $\Delta A$ where q is a quaternion, determining the current quaternion representation of orientation $q_t = \Delta q q_{t-1}$ where $q_{t-1}$ is the last computed quaternion, and normalizing $q_t$ to determine orientation.

16. The method of claim 16 in which said step of extracting $\Delta q$ from $\Delta A$ further includes:

calculating the trace of $\Delta A$;

determining whether said trace is positive;

if said trace is positive then finding $\Delta q$ from $\Delta q_0 = \text{trace} + \epsilon$ where $\epsilon$ is $\frac{1}{2}$ Euclidean norm of $\Delta A$ $\Delta q_1 = -\Delta A_{23} + \Delta A_{32}$ $\Delta q_2 = -\Delta A_{31} + \Delta A_{13}$ $\Delta q_3 = -\Delta A_{12} + \Delta A_{21};$ if said trace is not positive and $\Delta A_{11}$ is larger than $\Delta A_{22}$ and $\Delta A_{33}$, then finding $\Delta q$ from $\Delta q_0 = -\Delta A_{23} + \Delta A_{32}$ $\Delta q_1 = \epsilon + \Delta A_{11} - \Delta A_{22} - \Delta A_{33}$ $\Delta q_2 = \Delta A_{12} + \Delta A_{21}$ $\Delta q_3 = \Delta A_{13} + \Delta A_{31};$ if said trace is not positive and $\Delta A_{22}$ is larger than $\Delta A_{11}$ and $\Delta A_{33}$, then finding $\Delta q$ from $\Delta q_0 = -\Delta A_{31} + \Delta A_{13}$ $\Delta q_1 = \Delta A_{12} + \Delta A_{21}$ $\Delta q_2 = \epsilon - \Delta A_{11} + \Delta A_{22} - \Delta A_{33}$ $\Delta q_3 = \Delta A_{23} + \Delta A_{32};$ and if said trace is not positive and $A_{33}$ is larger than $A_{11}$ and $A_{22}$, then finding $\Delta q$ from $\Delta q_0 = -\Delta A_{12} + \Delta A_{21}$ $\Delta q_1 = \Delta A_{13} + \Delta A_{31}$ $\Delta q_2 = \Delta A_{23} + \Delta A_{32}$ $\Delta q_3 = \epsilon - \Delta A_{11} - \Delta A_{22} + \Delta A_{33}.$ 17. An apparatus for determining the position and orientation of a remote object relative to a reference coordinate frame comprising:

a plurality of radiating means for radiating electromagnetic energy, said radiating means having independent components defining a source reference coordinate frame;

a transmitter means for applying to said plurality of radiating means electrical signals which generate a plurality of radio frequency electromagnetic fields, said electromagnetic fields being distinguishable from one another;

a plurality of receiving means for receiving said transmitted electromagnetic fields, said receiving means being disposed on a remote object and said receiving means having independent components for detecting each of said transmitted electromagnetic fields and defining a sensor reference coordinate frame; and analyzing means for receiving the output of said receiving means and converting the components of said transmitted electromagnetic fields received by said receiving means into remote object position, and orientation relative to said source reference coordinate frame, said analyzing means including means for establishing a signal matrix S representative of the received components of said electromagnetic fields, means for determining $S^TS$ and normalizing to determine said position vector r, means for forming $PH^{-1}P^T$, means for post multiplying the signal matrix S by said $PH^{-1}P^T$ and forming a matrix $X = SPH^{-1}P^T$;

means for forming $\Delta A = A_{t-1}{}^T X$ where A is a matrix representing orientation and $A_{t-1}$ is the last computed orientation matrix, extracting means for extracting $\Delta q$ from $\Delta A$ where q is a quaternion, means for determining the current quaternion representation of orientation $q_t = \Delta q q_{t-1}$ where $q_{t-1}$ is the last computed quaternion, and means for normalizing $q_t$ to determine orientation.

18. The apparatus in claim 18 in which said extracting means comprises:

means for calculating the trace of $\Delta A$;

determining means for determining if said trace is positive;

calculating means responsive to said determining means for calculating $\Delta q$;

said calculating means programmed to calculate $\Delta q$ as $\Delta q_0 = \text{trace} + \epsilon$ where $\epsilon$ is $\frac{1}{2}$ Euclidean norm of $\Delta A$, $\Delta q_1 = -\Delta A_{23} + \Delta A_{32},$ $\Delta q_2 = -\Delta A_{31} + \Delta A_{13}$ $\Delta q_3 = -\Delta A_{12} + \Delta A_{21}$ if said trace is positive;

said calculating means further programmed to calculate $\Delta q$ as $\Delta q_0 = -\Delta A_{23} + \Delta A_{32}$ $\Delta q_1 = \epsilon + \Delta A_{11} - \Delta A_{22} - \Delta A_{33}$ $\Delta q_2 = \Delta A_{12} + \Delta A_{21}$ $\Delta q_3 = \Delta A_{13} + \Delta A_{31}$ if said trace is not positive and $\Delta A_{11}$ is larger than $\Delta A_{22}$ and $\Delta A_{33}$;
said calculating means further programmed to calculate $\Delta q$ as $\Delta q_0 = -\Delta A_{31} + \Delta A_{13}$ $\Delta q_1 = \Delta A_{12} + \Delta A_{21}$ $\Delta q_2 = \epsilon - \Delta A_{11} + \Delta A_{22} - \Delta A_{33}$ $\Delta q_3 = \Delta A_{23} + \Delta A_{32}$;

if said trace is not positive and $\Delta A_{22}$ is larger than $\Delta A_{11}$ and $\Delta A_{33}$; and
said calculating means further programmed to calculate $\Delta q$ as $\Delta q_0 = -\Delta A_{12} + \Delta A_{21}$ $\Delta q_1 = \Delta A_{13} + \Delta A_{31}$ $\Delta q_2 = \Delta A_{23} + \Delta A_{32}$ $\Delta q_3 = \epsilon - \Delta A_{11} - \Delta A_{22} + \Delta A_{33}$ if said trace is not positive and $\Delta A_{33}$ is larger than $\Delta_{11}$ and $\Delta_{22}$.

19. The apparatus in claim 1 in which said blending means includes means for selectively increasing or decreasing the proportion of said prior solution for orientation blended into said new solution to regulate the amount of lag in the apparatus.

* * * * *

UNITED STATES PATENT AND TRADEMARK OFFICE
CERTIFICATE OF CORRECTION

PATENT NO. : 4,737,794

DATED : April 12, 1988

INVENTOR(S) : Herbert R. Jones

It is certified that error appears in the above-identified patent and that said Letters Patent is hereby corrected as shown below:

Column 5, line 36:

"u" should be --$\vec{u}$--;

Column 5, line 40:

"$r = \frac{1}{|u|} u$" should be --$\hat{r} = \frac{1}{|\vec{u}|} \vec{u}$--;

Column 5, line 46:

"find $C_T$" should be --find $C^T$--;

Column 6, line 12:

"$r = \sqrt[1/3]{\frac{3}{|V|}}$ ; and" should be --$r = \sqrt[1/3]{\frac{3}{|\vec{V}|}}$ ; and --

Column 6, line 38:

"transcendentals" should be --transcendentalisms--;

Column 6, line 45:

"$S^T S = \frac{1}{r^{6-}} PH^2 p^T = \frac{1}{r^6} \left( \frac{\widehat{3rr} + I}{4} \right)$" should be --$S^T S = \frac{1}{r^6} PH^2 p^T = \frac{1}{r^6} \left( \frac{3\hat{\hat{r}}\hat{r}^T + \tilde{I}}{4} \right)$--

Column 8, line 12:

After 1+ "q," should be --$q_i$ --

UNITED STATES PATENT AND TRADEMARK OFFICE
CERTIFICATE OF CORRECTION

PATENT NO. : 4,737,794

DATED : April 12, 1988

INVENTOR(S) : Herbert A. Jones

It is certified that error appears in the above-identified patent and that said Letters Patent is hereby corrected as shown below:

Column 9, line 6:

"eauation" should be --equation--;

Column 9, lines 50 and 52:

"X" should be --$\underline{X}$--;

Column 9, line 63:

"$X = SPH^{-1}p^T$" should be --$\underline{X} = SPH^{-1}p^T$--;

Column 10, line 21:

"$\Delta q_1 = -\Delta A_{23} + \Delta A$" should be --$\Delta q_1 = -\Delta A_{23} + \Delta A_{32}$--;

Column 12, line 4:

"$\cos\theta \hat{r} = \hat{M}\cdot\hat{\hat{rr}} = \hat{M}^I\hat{\hat{rr}} = \hat{\hat{rr}}^T\hat{M} = R\hat{M}$" should be
--$\cos\theta\hat{r} = \hat{M}\cdot\hat{\hat{rr}} = \hat{M}^T\hat{\hat{rr}} = \hat{\hat{rr}}^T\hat{M} \triangleq R\hat{M}$--

Column 12, line 7:

"$r^t\hat{M}$" should be --$\hat{r}^t\hat{M}$--;

Column 12, line 24:

"$\vec{M} = \pi a^2 I\hat{M}$" should be --$\vec{M} = \pi a^2 I\vec{M}$-- ;

UNITED STATES PATENT AND TRADEMARK OFFICE
CERTIFICATE OF CORRECTION

PATENT NO. : 4,737,794

DATED : April 12, 1988

INVENTOR(S) : Herbert R. Jones

It is certified that error appears in the above-identified patent and that said Letters Patent is hereby corrected as shown below:

Column 13, line 39:

"$L\varepsilon\{1,3,5,\ldots\}$" should be --$\forall L\varepsilon\{1,3,5,\ldots\}$--;

Column 14, line 67:

"for" should be --from--;

Column 15, line 20:

"V" should be --$\hat{V}$--;

Column 18, Claim 12, line 47:

"were" should be --where--;

Column 18, Claim 13, line 59:

"claim 13" should be --claim 12--;

Column 18, Claim 13, line 61:

"r" should be --$\hat{r}$--;

Column 18, Claim 14, line 62:

"Claim 13" should be --claim 12--;

Column 19, Claim 15, line 25:

"X" should be --$\underline{\overline{X}}$--;

Column 19, Claim 15, line 26:

"$^T X$" should be --$^T\underline{\overline{X}}$--;

Column 19, Claim 16, line 34:

"claim 16" should be --claim 15--;

Column 20, Claim 17, line 41:

"r" should be --$\hat{r}$--;

UNITED STATES PATENT AND TRADEMARK OFFICE
CERTIFICATE OF CORRECTION

PATENT NO. : 4,737,794

DATED : April 12, 1988

INVENTOR(S) : Herbert R. Jones

It is certified that error appears in the above-identified patent and that said Letters Patent is hereby corrected as shown below:

Column 20, Claim 18, line 54:

"claim 18" should be --claim 17--.

Signed and Sealed this

Seventeenth Day of January, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,737,794
DATED : April 12, 1988
INVENTOR(S) : Herbert R. Jones

It is certified that error appears in the above-identified patent and that said Letters Patent is hereby corrected as shown below:

Column 8, line 20:

After $-q_1^2+$ "$q_1^2 - q_3^2$" should be -- $q_2^2 - q_3^2$ --

Signed and Sealed this

Twenty-ninth Day of August, 1989

Attest:

DONALD J. QUIGG

Attesting Officer

Commissioner of Patents and Trademarks